United States Patent [19]

Brinkmann et al.

[11] Patent Number: 5,715,915
[45] Date of Patent: Feb. 10, 1998

[54] BRAKE FOR RAIL CARS

[75] Inventors: Andreas Brinkmann, Remscheid; Dietrich Radtke, Oerlinghausen; Hans Engelbracht, Wermelskirchen; Thomas Timmermann, Solingen, all of Germany

[73] Assignees: Hanning & Kahl GmbH & Co.; Bergische Stahl-Industrie Verkehrstechnik GmbH, both of Germany

[21] Appl. No.: 778,219

[22] Filed: Jan. 8, 1997

[30] Foreign Application Priority Data

Jan. 9, 1996 [DE] Germany ............ 196 00 486.1

[51] Int. Cl.⁶ ............................................. B61H 13/00
[52] U.S. Cl. .................. 188/59; 188/33.46; 188/369
[58] Field of Search ................. 188/18 R, 18 A, 188/35, 58, 59, 71.1, 72.1, 72.3, 72.4, 72.9, 73.39, 73.46, 73.97, 79.55, 170, 206, 218 R, 218, 369, 370; 301/6.8

[56] References Cited

U.S. PATENT DOCUMENTS

| | | | |
|---|---|---|---|
| 3,830,343 | 8/1974 | Gardner | 188/72.9 |
| 3,897,858 | 8/1975 | Toshida et al. | 188/73.47 |
| 4,043,433 | 8/1977 | Rainbolt | 188/73.43 |
| 4,072,214 | 2/1978 | Havaikawa et al. | 188/73.47 |
| 4,301,895 | 11/1981 | Harrison et al. | 188/59 |
| 4,330,045 | 5/1982 | Myers | 301/6.8 |
| 4,361,358 | 11/1982 | Bonniwell | 301/6.8 |
| 4,729,455 | 3/1988 | May | 188/58 |
| 5,407,032 | 4/1995 | Gaudefroy et al. | 188/58 |
| 5,462,139 | 10/1995 | Jones, Jr. et al. | 188/59 |
| 5,547,047 | 8/1996 | Kohar et al. | 188/59 |

FOREIGN PATENT DOCUMENTS

| | | | |
|---|---|---|---|
| 399694B | 9/1993 | Austria . | |
| 2821646 | 11/1979 | Germany | 301/6.8 |

Primary Examiner—Chris Schwartz
Attorney, Agent, or Firm—Rothwell, Figg, Ernst & Kurz, P.C.

[57] ABSTRACT

A brake for rail cars comprises a floating caliper disc brake attached to a cylindrical housing element of a drive housing. The drive housing may be the motor housing, the transmission housing or a common housing for the drive motor and the transmission. The cylindrical housing element has an opening in its peripheral wall in which the floating caliper is mounted. The actuator is mounted in an entry in the peripheral wall of the drive housing. This mounting arrangement allows easier accessiblity to the brake during servicing operations and provides for ventilation of the brake disc.

10 Claims, 1 Drawing Sheet

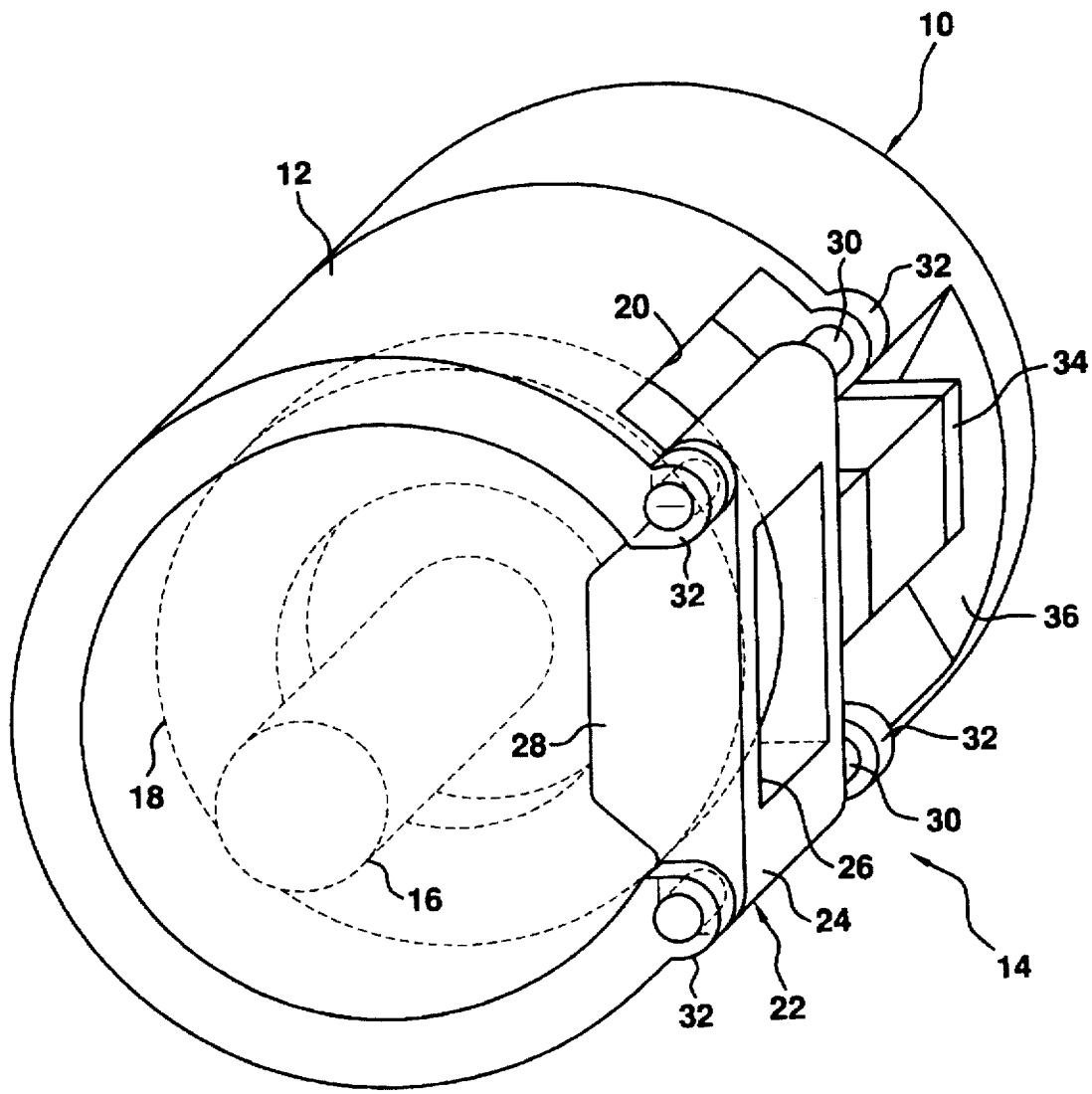

BRAKE FOR RAIL CARS

BACKGROUND OF THE INVENTION

The invention concerns a brake for a rail car. In particular, the invention concerns a brake, which serves as an emergency and/or parking brake.

In rail cars, for example, in street lines, the wheels are usually mounted in a block or traveling mechanism, which also takes up a drive motor as well as a transmission for driving the wheels. The emergency and parking brake for such rail cars is usually configured as a disk brake, which is arranged outside the motor housing and also outside the transmission housing on a shaft combining the motor with the transmission. The disk brake is placed rigidly on the shaft, while a brake binding piece or a floating caliper belonging thereto is attached by means of a special console stationary on the block or motor or transmission housing.

In the case of the floating caliper version, the floating caliper usually has a flat base plate, which lies in a plane tangential to the edge of the brake disk and forms on both sides of the brake disk two projections that are directed radially inward. A first brake lining is introduced rigidly on one of the projections, whereas a second brake lining is arranged on a brake shoe that can be guided and displaced on the second projection. The base plate, in turn, is displaced on guide bolts running parallel to the shaft. Then, if a force is exercised on the moving brake shoe by means of an actuator a corresponding counter-force acts on the floating caliper, so that the latter is displaced as a whole. Consequently, the brake disk is clamped and braked uniformly between the brake linings.

For safety reasons, the brake is formed for the most part as a spring-loaded brake, i.e., the brake linings are elastically clamped by the actuator in the active position applied to the brake disk, and in normal operation, the brake is held in the inactive position by a hydraulic and/or mechanical release device. In order to trigger an emergency braking, consequently, no active element is necessary; rather, it is only necessary to be able to deactivate the release device.

The conventional brake requires a relatively high structural expenditure and claims a relatively large space in the block, since the console for the brake binding piece or the floating caliper must be attached in a stable manner, such that the reaction forces that occur during braking can be absorbed, and since also the relatively bulky actuator for the spring-loaded brake must be mechanically combined in a suitable way with the brake binding piece or the floating caliper. Another disadvantage consists of the fact that the console makes it difficult to access the brake linings. Monitoring or changing the brake linings, as well as servicing operations on the actuator must thus be undertaken usually from an assembly pit.

SUMMARY OF THE INVENTION

The task of the invention is to create a brake of the type named initially, which is characterized by a simplified construction, a smaller space requirement, and a user-friendly servicing compatibility.

In the case of the brake of the invention, the brake disk is accommodated in a cylindrical housing segment of a drive housing. In the case of the drive housing, this may be the motor housing, the transmission housing, or a common housing for the drive motor and the transmission. The cylindrical housing segment has an opening in its peripheral wall, in which the floating caliper is mounted.

This construction thus permits the integration of the entire brake into the drive housing, thus saving space, so that the reaction forces operating on the floating caliper can be taken up directly by the drive housing and no special console is needed for attaching the floating caliper. In this way, an essentially simpler and more compact construction is obtained. Also, since the brake linings in the floating caliper lie in the opening in the peripheral wall of the housing, they are easily accessible during servicing operations. The cylindrical housing segment may be oriented such that its opening that takes up the floating caliper points to the outside of the vehicle. Servicing operations, such as changing the brake linings, may then be conducted directly from the side of the vehicle, so that the block of the vehicle involved need not be driven over an assembly pit.

Another advantage of the solution of the invention consists of the fact that the disk brake is enclosed in the cylindrical housing segment, whose opening is extensively sealed by the floating caliper. The brake disk is thus better protected against mechanical damage and against sprayed water, so that in the case of an emergency braking, a high braking effect is achieved, since the brake linings engage initially on a dry brake disk.

Advantageous further developments and embodiments of the invention result from the subclaims.

The actuator is preferably accommodated directly adjacent to the floating caliper outside the drive housing in an entry [indentation] in the peripheral wall of this drive housing. By the direct coupling of the actuator with the floating caliper, a further structural simplification and a high operational reliability are obtained, and yet the actuator lying outside the drive housing is as easily accessible as the floating caliper during servicing operations. In addition, the floating caliper and the actuator form a uniform structural group, which can be mounted in one operation simply and, securely on the drive housing.

A preferred example of embodiment of the invention based on the drawing is explained in more detail in the following.

BRIEF DESCRIPTION OF THE DRAWINGS

The single FIGURE of the drawing shows a perspective view of a part of a drive housing, at and in which the brake of the invention is installed.

DETAILED DESCRIPTION OF THE DRAWINGS

Drive housing 10, of which only a part is shown in the drawing, for example, takes up an electrical drive motor or a transmission for a driven wheel of a rail car and is mounted in the known way in the block of the rail car. This drive housing 10 has an essentially cylindrical housing segment 12, at and in which brake 14 of the invention is mounted. Cylindrical housing segment 12 is coaxially passed through by a shaft 16 belonging to the drive train for the respective wheel of the rail car. In the case of shaft 16, this involves the motor shaft or the initial transmission shaft. For example, if cylindrical housing segment 12 is an "intermediate flange", which joins a part of drive housing 10 taking up the motor with a (not shown) transmission housing, then shaft 16 is the initial shaft of the motor, which also forms the input shaft of the transmission.

A braking disk 18 is mounted inside housing segment 12 and this can co-rotate on shaft 16. Other components of the drive motor and/or the transmission, which are not shown, may also be accommodated in housing segment 12.

The peripheral wall of housing segment 12 is interrupted in one place, preferably on the outside of the vehicle, by an opening 20. This opening 20 is extensively filled by a floating caliper 22 of brake 14 that cooperates with brake disk 18. Floating caliper 22 has a flat, rectangular base plate 24, which lies tangential to the periphery of brake disk 18 and is penetrated by a window-type opening 26 taking up the edge of the brake disk. On both sides of opening 26, base plate 24 forms two projections 28 projecting in the direction onto shaft 16, only one of which can be seen in the drawing. Projection 28 that can be seen in the drawing bears a brake lining in the usual way on the inside (this cannot be seen in the drawing). On the opposite side of brake disk 18, a corresponding brake lining is arranged on a (not shown) brake shoe, which can be displaced back and forth with respect to base plate 24 on brake disk 18, thus parallel to the axis of shaft 16.

Base plate 24 in turn can be shifted on two parallel guide bolts 30 running parallel to shaft 16, whose ends are attached in eyes 32 formed at housing segment 12.

On the side of floating caliper 22 turned away from the observer in the drawing, an actuator 34 is attached, which lies partly in opening 20 of housing segment 12 and partly in an entry [indentation] 36 in the outer wall of the adjacent part of drive housing 10, which opens to the outside. Of actuator 34, whose construction is known as such, only the cartridge-type, cuboid-shaped housing is represented in the drawing. A heavy-duty pressure spring is accommodated inside this housing in the known way, and this spring operates by means of an actuating rod that is not shown onto the above-mentioned brake shoe of floating caliper 22, which can be displaced, and the latter is clamped against brake disk 18. The reaction forces of the pressure spring are transferred by means of the housing of actuator 34 onto base plate 24 of the floating caliper, so that the brake lining introduced at solid projection 28 is also drawn against brake disk 18.

A hydraulic release device is also incorporated in the housing of actuator 34; this device is joined with a suitable pressure source by means of pressure tubing, which is not shown, and compresses the pressure spring during the travel of the rail car and thus holds brake 14 in the released position.

For example, if an emergency braking is to be conducted by means of brake 14, then the pressure is unloaded from the restoring device of actuator 34, so that the brake linings of the floating caliper are clamped against the brake disk by means of the spring force. The reaction forces operating in the peripheral direction of the brake disk on floating caliper 22 are led off by means of guide bolts 30 and eyes 32 directly into the wall of housing segment 12 and are thus taken up stably. The window-shaped opening 26 of the floating caliper makes possible a ventilation of the brake disk. Since brake 14 is only used as an emergency brake or parking brake and consequently, the periods in which friction heat occurs are only relatively short, this opening is sufficient to prevent an overheating of the brake disk and the brake linings.

Since floating caliper 22 and actuator 34 lie in the outside wall of drive housing 10, they can be comfortably reached from the outside of the vehicle at any time, so that monitoring, servicing and repair operations may be conducted without problem.

We claim:

1. A brake for rail cars comprising a drive housing for a drive motor and/or transmission of the rail car, further comprising:

a brake disk mounted to be able to co-rotate on a shaft of the motor or of the transmission, a floating calipers arranged on the periphery of the brake disk, which has brake linings on both sides of the brake disk lying opposite one another, and an actuator for compressing the brake linings against the brake disk, the brake disk being accommodated in an essentially cylindrical housing segment of a drive housing, and the floating caliper mounted in an opening in the peripheral wall of the cylindrical housing segment.

2. A brake according to claim 1, further characterized in that the floating caliper has an approximately rectangular base plate, which lies in a plane tangential to the brake disk and extensively fills the opening of the housing segment.

3. A brake according to claim 1, further characterized in that the floating caliper is mounted so that it can be displaced on two guide bolts attached by their ends to the drive housing and running parallel to the shaft.

4. A brake according to claim 1, further characterized in that the actuator directly connects with the floating caliper in the axial direction of the shaft.

5. A brake according to claim 4, further characterized in that the actuator and the floating caliper are combined to form one structural unit.

6. Brake according to claim 4, further characterized in that the actuators with its end turned away from the floating calipers lies in an entry indentation of the drive housing adjacent to the opening of the housing segment and open to the outside.

7. A brake according to claim 2, further characterized in that the floating caliper is mounted so that it can be displaced on two guide bolts attached by their ends to the drive housing and running parallel to the shaft.

8. A brake according to claim 2, further characterized in that the actuator directly connects with the floating caliper in the axial direction of the shaft.

9. A brake according to claim 3, further characterized in that the actuator directly connects with the floating caliper in the axial direction of the shaft.

10. A brake according to claim 5, further characterized in that the actuator with its end turned away from the floating caliper lies in an indentation of the drive housing adjacent to the opening of the housing segment and open to the outside.

* * * * *